April 2, 1929.  A. A. ROBB  1,707,815
CUSHION TIRE WITH ARCHED BASE
Filed Oct. 7, 1926
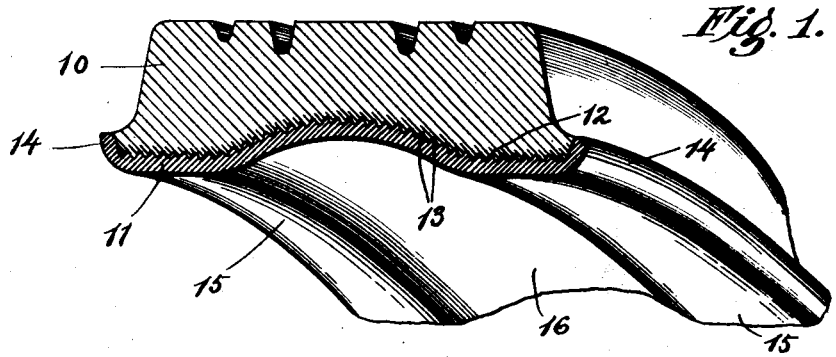
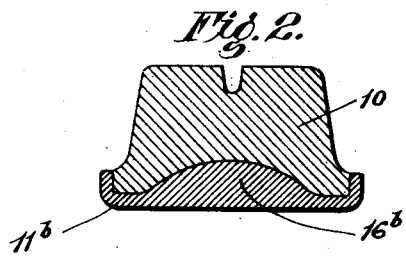
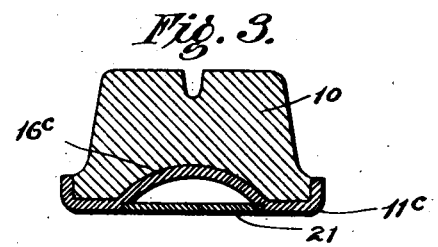
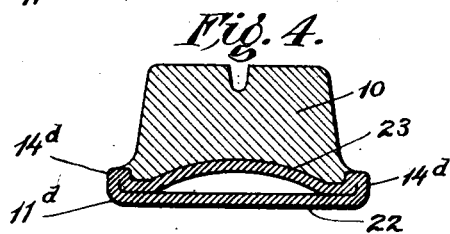
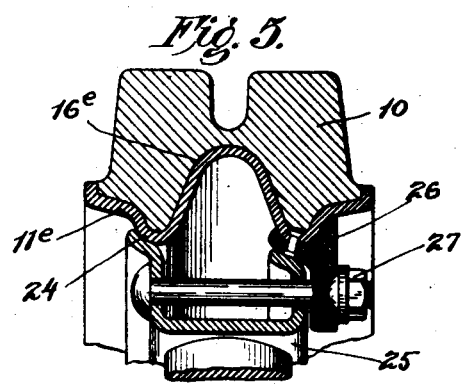
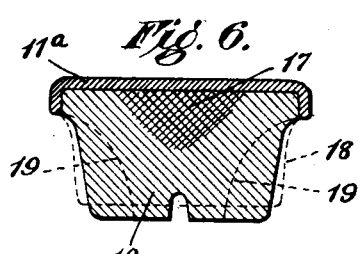
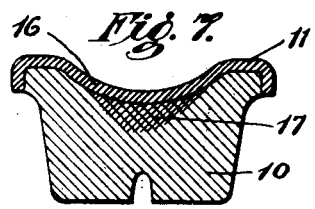
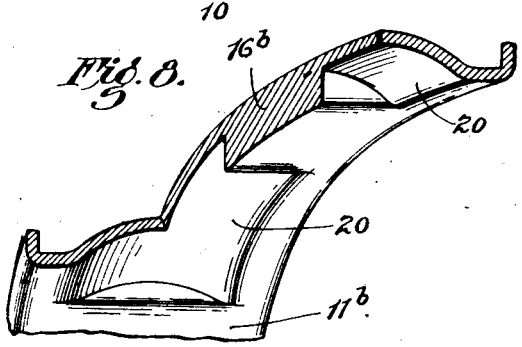
Inventor,
Arthur A. Robb
By Pierson, Eakin & Avery,
Attys.

Patented Apr. 2, 1929.

1,707,815

UNITED STATES PATENT OFFICE.

ARTHUR A. ROBB, OF CUYAHOGA FALLS, OHIO, ASSIGNOR TO THE B. F. GOODRICH COMPANY, OF NEW YORK, N. Y., A CORPORATION OF NEW YORK.

CUSHION TIRE WITH ARCHED BASE.

Application filed October 7, 1926. Serial No. 140,021.

This invention relates to rubber tires for vehicles and especially to solid cushion tires comprising a metal base and a rubber cushion tire body having substantially its entire inner periphery vulcanized to said base.

My principal objects are to obtain a solid tire which will run cooler under like conditions than prior solid tires of equivalent size and carrying capacity, and to reduce the amount of rubber in the tire without substantially sacrificing its resiliency.

Of the accompanying drawings, Fig. 1 is a sectional perspective view showing a portion of a cushion tire structure of the pressed-on type embodying my invention.

Figs. 2, 3 and 4 are cross-sections of a tire showing three modified forms of a pressed-on base.

Fig. 5 is a cross-section showing an embodiment of the bolted-on demountable type.

Fig. 6 is a cross-section showing an ordinary solid rubber tire and base shaded to illustrate that portion of the rubber body which is practically inactive under load conditions.

Fig. 7 is a cross-section of a form of my invention generally similar to that shown in Fig. 1, illustrating the removal of a large part of the inactive portion of the rubber by reason of the base construction.

Fig. 8 is a sectional perspective view showing another modified form of base.

In the drawings, 10 is the rubber cushion body of my improved tire, the tread surface of which, as shown, is substantially cylindrical or transversely flat and may be interrupted by grooves or recesses to increase the resiliency and tractive properties, and 11 is the metal base ring upon which said cushion body is vulcanized, there being preferably employed the usual layer 12 of hard rubber adjacent to the base and interlocking with shallow ribs 13 on the latter for securing the necessary adhesion between the resilient rubber and the metal.

The base 11 is provided with the usual outwardly-turned marginal flanges 14 and with transversely horizontal side seating portions 15 for mounting the tire in pressed-on relation with the tire seat on the wheel felly or fixed rim. Between these sides seating portions the base is transversely arched at 16 throughout the whole circumference of the tire, so that the base presents an outward convexity to the middle portion of the cushion body 10. By reason of the substantially flat tread, the shallowest portion of the rubber cushion tire body is radially aligned with the convex base portion 16.

The beneficial effect of this medial arching or outward convexity of the tire base is twofold,—first, it saves a considerable portion of the rubber which would go into an ordinary tire of equivalent size and load-carrying capacity, and accordingly reduces the cost, without substantially detracting from the resiliency of the tire, and secondly, it causes the tire to run cooler under equal conditions of load and speed.

The reason for this will be apparent on comparing Fig. 6, which shows an ordinary tire, and Fig. 7, which shows a form of my improved tire somewhat narrower than illustrated in Fig. 1. The shaded portion 17 of the soft rubber having approximately the shape represented in Fig. 6, occupying the middle portion of the rubber body adjacent the rim or base $11^a$, is relatively inactive during the flexing of the tire under load, the flow or yielding of the rubber being confined mainly to the tread and side portions of the rubber. In this view, 18 represents, in broken lines, a loaded outline of the cushion body, and the broken lines 19, 19 represent substantially the lines of shearing force along which partial failure of the tire by cleavage or rupture will frequently occur.

Under conditions of excessive load and speed, the inner central portion of an ordinary solid tire, corresponding to the area 17, frequently reaches a temperature so high that the tire "blows up" due to melting and piping of the rubber, which ends its usefulness. It will be evident on viewing Fig. 7 in comparison with Fig. 6 that the provision of the arched portion 16 in the base 11 very largely eliminates the inactive rubber 17 in the middle of the tire body and in consequence the tire runs considerably cooler, as shown by actual comparative tests. This construction does not substantially affect the natural flow lines of the rubber under load, and the arching of the base may, if desired, be carried to such an extent as to leave only the narrow zone of comparatively inactive rubber which is necessarily present immediately adjacent to the base or the hard rubber layer thereon.

Fig. 2 shows a modified form of base $11^b$ having a solid arched or convex portion $16^b$, which is transversely flat or horizontal across its entire width in order to increase the effective inner seating periphery of the base as compared with the bases shown in Figs. 1 and 7. This transverse flatness of the inner periphery may be either continuous in a circumferential direction, or it may be interrupted as indicated in Fig. 8 where the rim 11$^b$ is shown with hollows or concavities 20 alternating with the flat bottomed thicker portions 16$^b$ for the sake of lightness and saving of material.

In Fig. 3, transverse continuity of the rim 11$^c$ is obtained with an inner metal ring 21 forming a bridge across the arched portion 16$^c$ of said base. This member may be a transversely split ring sprung into place, and it may, if desired, be secured to the main base member by welding or otherwise, or it may be an endless ring expanded into place.

In Fig. 4 the base 11$^d$ is composed of an inner ring 22 which may be transversely flat on its seating side throughout its entire circumference, and is formed with marginal flanges 14$^d$, and an outwardly arched outer metal ring 23 overlying said inner ring and lying between the flanges 14$^d$. These two base members may be separately formed and the outer ring 23 may, if desired, be permanently secured to the inner ring as by welding at the edges, or the two members may be originally integral in the form of a tube which is flattened and given the necessary shape by appropriate rolling or other shaping methods.

Fig. 5 shows a bolted-on demountable form of tire having a base 11$^e$ formed with a deeply-arched middle portion 16$^e$ and a circumferential seating shoulder or rib 24 on one side to seat against a common form of wheel felly 25, and provided on the other side with attaching lugs 26 secured by the usual bolts 27.

My invention is susceptible of embodiment in various forms, as indicated by the several examples given, and it will be understood that other modifications are permissible within the scope of the claims.

I claim:

1. A solid tire structure comprising an annular, rigid base structure and a rubber cushion tire body secured thereon by vulcanization and having a substantially cylindrical tread surface, the base structure comprising a radially outer, circumferential, ridge portion locally secured throughout its outer surface to the tire body and occupying space therein in which the rubber would be substantially inactive in service if the said space were occupied by rubber of the tire body, the said ridge portion radially extending substantially farther toward the tread of the tire body than any part of the base structure laterally confining the said body, so that the rubber at each side of the bridge portion may be active in service.

2. A structure as defined in claim 1 in which the base structure is of the pressed-on type and with the tire body constitutes a solid assembly in the sense of not being hollow in cross-section.

In witness whereof I have hereunto set my hand this 27th day of September, 1926.

ARTHUR A. ROBB.